UNITED STATES PATENT OFFICE.

ALEXANDER SCHULTZ, OF MULHOUSE, FRANCE.

IMPROVED MORDANT FOR FIXING ANILINE COLORS.

Specification forming part of Letters Patent No. 37,426, dated January 13, 1863.

*To all whom it may concern:*

Be it known that I, ALEXANDER SCHULTZ, of Mulhouse, but temporarily residing in the city of Lyons, in the Empire of France, have invented certain new and useful Improvements in Mordants for Fixing the Aniline and other Coloring-Matter Extracted from Coal-Tar; and I hereby declare that the following is a full, clear, and exact description of the same.

My invention consists in a new process of fixing the aniline and other coloring-matter extracted from coal-tar in printing and dyeing; also, in the preparation of lakes derived from said coloring-matter. The mordant prepared for printing and dyeing purposes according to my invention is a combination of acetate of alumina with arsenite of soda. This combination or compound is destined to take place of the albumen, gluten, tannin, and other substances heretofore used to fix aniline colors.

To illustrate, I shall now proceed to describe my invention as applied to the fixing of the purple or the violet extracted from coal-tar.

I take four grams (one gram being 15.43315 troy grains) of the powdered aniline-purple of commerce, one-fourth of a liter (one liter being 61.074 United States cubic inches) of acetate of alumina at 10° Baumé, and twenty grams of arsenite of soda, and I mix these ingredients at the ordinary temperature. The mixture is thickened by means of starch boiled in water. The quantity of starch put into the mixture varies with the shade of color intended to be produced. More starch is added if the coloring-matter proposed to be fixed is to be light or bright, and less starch is introduced into the mixture if the color is to have a dark shade or deep hue. For printing purposes, I prefer to apply to the tissue the arsenite of soda, the coloring-matter, and the acetate of alumina at one time—*i. e.*, as a mixture. The print is afterward steamed. The different ingredients, however, may be applied separately.

For dyeing purposes, I prefer to proceed by first applying to the tissue or fiber a mixture of arsenite of soda and acetate of alumina, and by then passing the said tissue or fiber in the dye-bath in the usual manner.

In lieu of the arsenious acid or the salts or components derived therefrom, salts or components of antimony may be used as well as the salts or components of tin, and they may be employed in combination with alumina, as before stated.

By the application, as above set forth, of mordants to tissues or fibers, the color is more perfectly fixed, particularly if the fiber be of vegetable origin. A great economy in the coloring-matter is also obtained, and the beauty of the color is often heightened thereby.

Lakes are prepared in the following manner: I take aniline color, or any other analogous coloring-matter extracted from coal-tar, and precipitate it with arsenite of alumina derived by mixing arsenite of soda with acetate of alumina. The precipitate is then washed and dried. It may then be used for paint, or when combined with acetate of alumina it may be used for printing purposes. The color becomes fixed if the paint be subsequently steamed. Coloring-matter or dyes thus produced are ready to be used without any other intermediary means for fixing the colors.

The above example refers to violet or purple colors. By varying the proportions of the ingredients, different shades of the same color may be obtained. To produce pink, I substitute for the four grams of violet or purple of aniline used in the preceding process four grams of crystallized fuchsiacine, (term used to designate the aniline red of commerce.) Blue is obtained by substituting for either the purple or red, as above, four grams of aniline-blue of commerce in powder.

Having thus described my invention and the manner in which the same is or may be carried into effect, I shall state my claim as follows:

The preparation and use of the mordant hereinbefore described for fixing aniline or other coloring-matter extracted from coal-tar upon fibrous or textile material, the said mordant consisting, essentially, in the combination, in various proportions, of acetate of alumina with arsenite of soda, and whether used separately from but in connection with or as a mixture with the said coloring-matter or otherwise, substantially as herein set forth.

In testimony whereof I have signed my name to this specification before two subscribing witnesses.

ALEXANDER SCHULTZ.

Witnesses:
 JOSEPH RENARD,
 LOUIS WM. VIOLLIER,
  *Of Lyons.*